US009207956B2

(12) United States Patent
Schuler

(10) Patent No.: US 9,207,956 B2
(45) Date of Patent: Dec. 8, 2015

(54) CLASS LOADING DEVICE FOR A JAVA RUNTIME ENVIRONMENT, CLUSTER SYSTEM AND METHOD OF EXECUTING A FUNCTION

(71) Applicant: Fujitsu Technology Solutions Intellectual Property GmbH, München (DE)

(72) Inventor: Michael Schuler, München (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 14/513,651

(22) Filed: Oct. 14, 2014

(65) Prior Publication Data

US 2015/0106796 A1   Apr. 16, 2015

(30) Foreign Application Priority Data

Oct. 15, 2013   (DE) .......................... 10 2013 111 382

(51) Int. Cl.
*G06F 9/45* (2006.01)
*G06F 9/445* (2006.01)
(52) U.S. Cl.
CPC .............. *G06F 9/44521* (2013.01); *G06F 8/41* (2013.01)

(58) Field of Classification Search
CPC ............ G06F 9/44521; G06F 9/45516; G06F 9/45504; G06F 8/41; G06F 8/51; G06F 8/443
USPC ................................... 717/137, 139, 140, 148
See application file for complete search history.

(56) References Cited

U.S. PATENT DOCUMENTS

2007/0239405 A1* 10/2007 Behrens et al. ................... 703/2
2011/0320439 A1* 12/2011 Gruschko et al. ............. 707/722
2012/0005190 A1* 1/2012 Faerber et al. ................ 707/718

OTHER PUBLICATIONS

Nianhua Li et al., "From R to Java: the TypeInfo and RWebServices paradigm," Technical Report, BioConductor, 2006, S 1-8.
E. James Harner et al., "JavaStat: a Java/R-based statistical computing environment," Computation Statistics, vol. 24, 2009, S 295-302.
Xia Xie et al., "JRBridge: A Framework of Large-Scale Statistical Computing for R," 2012 IEEE Asia-Pacific Services Computing Conference (APSCC), Dec. 6-9, 2012, S 27-34.
"R in a Nutshell," 2nd edition, O'Reilly, 2012 (Abstract).
"Big data," Wikipedia, Sep. 6, 2013.

* cited by examiner

*Primary Examiner* — Anna Deng
(74) *Attorney, Agent, or Firm* — DLA Piper LLP (US)

(57) ABSTRACT

A class loading device for a Java runtime environment, wherein the class loading device is configured to load predetermined source code written in R programming language to parse the R source code and, based on the parsed R source code, generate corresponding bytecode at least of a first Java class and transfer same to the Java runtime environment.

12 Claims, 3 Drawing Sheets

CLASS LOADING DEVICE FOR A JAVA RUNTIME ENVIRONMENT, CLUSTER SYSTEM AND METHOD OF EXECUTING A FUNCTION

TECHNICAL FIELD

This disclosure relates to devices and methods of processing extensive data, in particular, to devices and methods of efficiently executing algorithms to process so-called "big data" problems.

BACKGROUND

According to the online encyclopedia Wikipedia, the term "big data" refers to the use of large amounts of data from multiple sources with a high processing speed to produce an economic benefit. Problems include primarily the capture, storing, searching, distribution, statistical analysis and display of large amounts of data. The volume of these amounts of data is in the terabyte, petabyte and exabyte ranges.

Due to the range of data to be processed, conventional electronic data processing systems are often not suitable, or are only suitable to a limited extent, to usefully process such extensive data. For example, relational database systems, which use, for data storage, an individual, local mass storage device and a schema which is identical for all data sets, are generally unsuitable for storing or processing such extensive data. Likewise, in the statistical evaluation of data, many programming languages are unsuitable because they do not have sufficiently specialized libraries for this purpose.

The R programming language is known inter alia from the book "R in a Nutshell," $2^{nd}$ edition, O'Reilly, 2012. The R programming language is particularly suitable for statistical calculations based on extensive data. Therefore, the R programming language is suitable in principle for processing big data problems, e.g., for implementing so-called "reduction functions" as used in the so-called "MapReduce" approach for processing big data problems.

One problem with the R programming language resides in the fact that the runtime environment used to execute it interprets the source code written in the programming language R. Due to the complexity associated with the interpretation, inter alia parsing of the source code, interpreted programming languages have a reduced running speed compared with programs written in other programming languages.

It could therefore be helpful to provide devices and methods which can accelerate the processing of extensive data, in particular the processing of big data problems using the R programming language. Preferably, existing components should be built on as far as possible to reduce the costs of developing new components.

SUMMARY

I provide a class loading device for a Java runtime environment, wherein the class loading device is configured to load predetermined source code written in R programming language to parse the R source code and, based on the parsed R source code, generate corresponding bytecode at least of a first Java class and transfer same to the Java runtime environment.

I also provide a cluster system having a plurality of mutually coupled cluster nodes that process extensive data, wherein each of the cluster nodes has a Java runtime environment, at least one Java runtime environment has the class loading device and is configured to compile R source code of at least one function using the class loading device in corresponding bytecode of a first Java class.

I further provide a method of executing a function written in R programming language including at least one Java class loading device compiling R source code, written in the R programming language, of the function in bytecode at least of a first Java class with a method corresponding to the function; and executing the function within the Java runtime environment by calling the bytecode of the corresponding method of the first Java class.

LIST OF REFERENCE SIGNS

Figure 1:
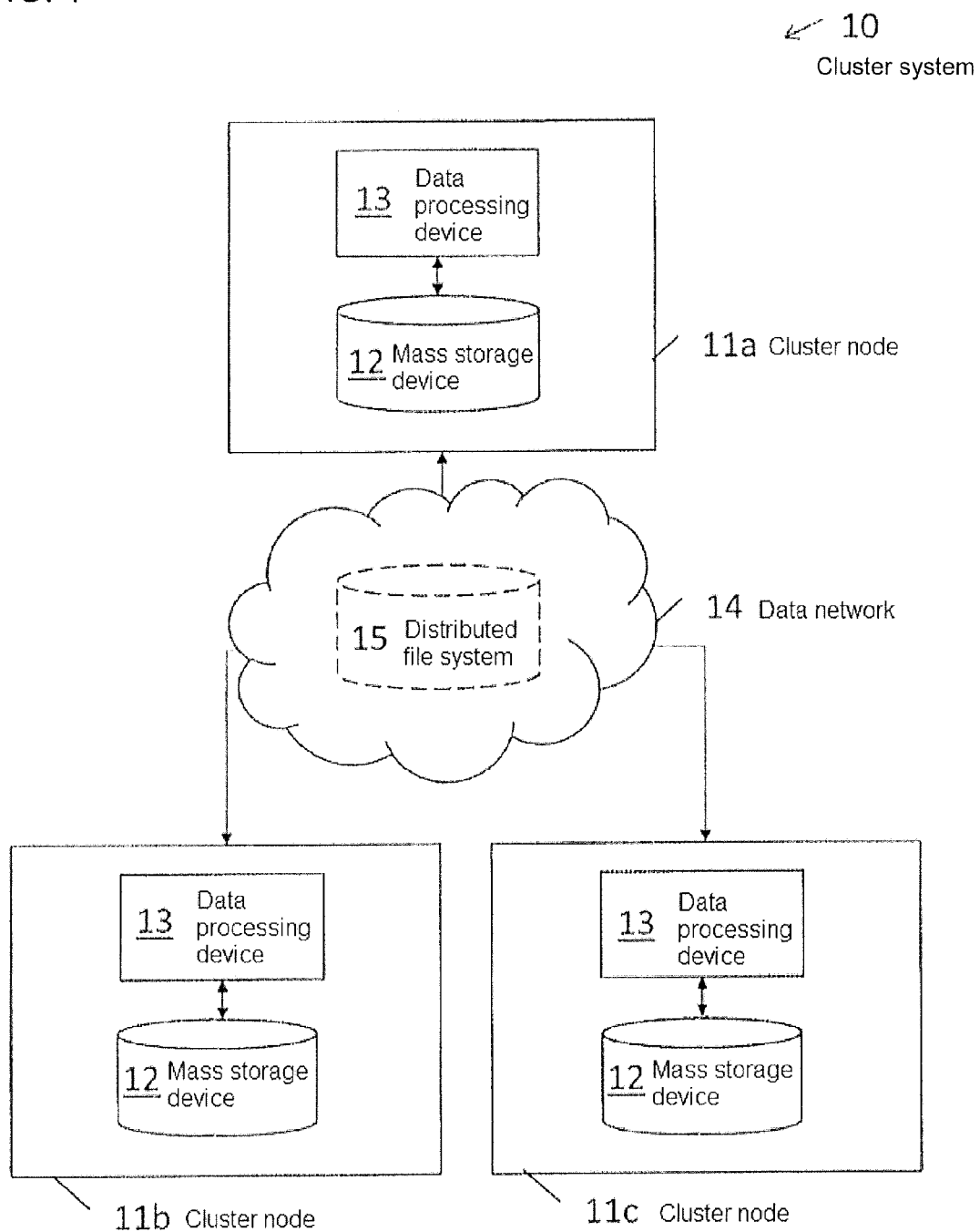
FIG. 1 shows a cluster system for processing big data problems.

10 Cluster system
11 Cluster node
12 Mass storage device
13 Data processing device
14 Data network
15 Distributed file system
20 Java runtime environment
21 R runtime environment
22 Java application
23 Hadoop framework
24 Class loading device
25 Library
26 R source code
27 Standard function
28 R system library
29 Java class
30 Java object
31 Java object
40 Method
41-49 Method steps

DETAILED DESCRIPTION

I provide a class loading device for a Java runtime environment. The class loading device may be configured to load predetermined source code written in the R programming language, hereinafter "R source code," to parse the R source code and, based on the parsed R source code, to generate corresponding bytecode at least of a first Java class and transfer same to the Java runtime environment.

By using a modified class loading device for a Java runtime environment, it is possible to convert source code, written in the R programming language, from programs or functions into compiled executable Java classes. "Executable Java class" is understood herein essentially to mean a representation of the Java class as bytecode executable by a so-called "Java virtual machine." Since parsing only has to be performed once when compiling the R source code, the subsequent execution of methods of the thus produced Java class is quicker than the interpretation of the original R source code which means that in particular when performing extensive statistical calculations, data processing is accelerated.

Advantageously, once-compiled Java classes based on corresponding R source code, may be stored in a library and are again transferred to the Java runtime environment as required. By way of the buffering and if applicable the re-retrieval, the outlay involved in the re-parsing and translation of the R source code can be avoided.

Further advantageously, the class loading device may further be configured to compile at least some functions of an R system library of an R runtime environment into corresponding executable Java classes or retrieve corresponding already-compiled Java classes from a library. By compiling or holding compiled functions of an R system library of an R runtime environment, execution of R program code within the Java runtime environment can be further accelerated. For example, many R system libraries can be freely downloaded via the CRAN website. The free availability of many very good libraries means that the R programming language is particularly suitable for the above-mentioned tasks.

Still further advantageously, the class loading device may provide at least a second and a third Java class. Instances of the second Java class represent a current state of an R runtime environment and instances of the third Java class represent objects of the R runtime environment. A plurality of instances of the third Java class can be allocated to one instance of the second Java class. By providing Java classes to model an R runtime environment and R objects contained therein, rapid and efficient data exchange between Java classes of the Java runtime environment and Java classes provided by the class loading device based on R program code can be performed in the storage device.

For example, extensive information can be transferred as transfer parameters to the first Java class or can be returned from the first Java class as a result type. Alternatively, a reference to an R environment can also be transferred to the first class to allow access to state variables of the R environment.

I also provide a cluster system having a plurality of mutually coupled cluster nodes to process extensive data, in particular big data problems. Each of the cluster nodes has a Java runtime environment. At least one Java runtime environment has a class loading device as previously described and is configured to compile R source code of at least one function using the class loading device in corresponding bytecode of a first Java class.

By using the cluster system in this second context, functions or programs written in the R programming language can be executed in a cluster system in a distributed manner. By compiling R source code in a Java class and executing same in a Java runtime environment of a cluster node, the execution speed of the executed functions or programs can be accelerated. A complete runtime environment does not have to be installed on each cluster node. In particular, the typically provided R interpreter can be replaced by a modified class loading device to execute R program code of a function and/or associated R system libraries on individual cluster nodes or all cluster nodes.

Advantageously, each cluster node further comprises a Java framework to implement a MapReduce algorithm and access a distributed file system to store data on the plurality of cluster nodes. For example, the Hadoop framework having the associated Hadoop Distributed File System (HDFS) can be installed on each of the cluster nodes. By using such a Java framework, tasks which relate to the distributed processing of data in a cluster system can easily be handled by the Java runtime environments of the plurality of cluster nodes. Therefore, a developer can concentrate on the provision of the actual functionality by the R source code.

Further advantageously, the Java runtime environment is configured to inject a Java method of accessing the distributed file system into the corresponding executable first Java class during execution of the at least one function of the R runtime environment. By injecting Java classes to access the distributed file system, access to data stored in a distributed manner can easily be integrated into the R source code.

I further provide a method of executing a function written in the R programming language. The method includes a Java class loading device compiling R source code, written in the R programming language, of the function into bytecode at least of a first Java class with a method corresponding to the function. The method further includes executing the function within the Java runtime environment by calling the bytecode of the corresponding method of the first Java class.

By way of those steps, the execution of typically interpreted R program code can be accelerated. Compiling can be performed, for example, by the class loading device in accordance with the first context described above.

Further advantages are disclosed in the following detailed description of examples.

My systems, devices and methods will be explained in detail hereinafter with the aid of examples and with reference to the figures. In the figures, instances of identical or similar components are designed with alphabetic suffixes. If no suffix is provided, the examples relate to all instances.

FIG. 1 shows a cluster system 10 that processes extensive data. In the example, the cluster system 10 includes three cluster nodes 11a to 11c. Each of the cluster nodes 11 includes at least one mass storage device 12 and a data processing device 13, in particular one or more processors. The individual cluster nodes 11 are coupled together via a data network 14, e.g., a local Ethernet data network.

In addition to the simple exchange of messages between the data processing devices 13 of the different cluster nodes 11a to 11c, the data network 14 is also used to provide a virtual distributed file system 15, via which some of the data stored on the mass storage devices 12 are made accessible for all cluster nodes 11. In the example, the distributed file system 15 is the so-called "Hadoop File System" (HDFS) which ensures not only the access but also the storage of data which is failsafe and distributed over the cluster system 10.

Figure 2:
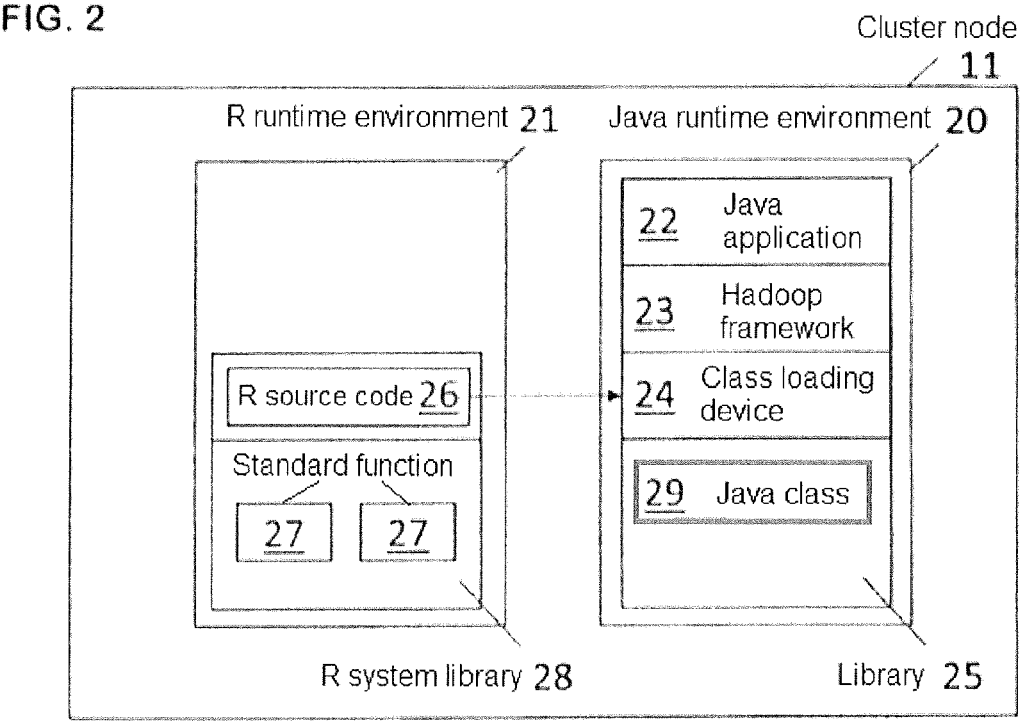
FIG. 2 shows a cluster node of the cluster system.

FIG. 2 shows an example of a configuration of a cluster node 11. A Java runtime environment 20 and an R runtime environment 21 are arranged on the cluster node 11 in a manner known per se.

The Java runtime environment 20 is used to execute methods of Java classes which together form at least one Java application 22. In the example, the Java application 22 is present on the Hadoop framework 23. The Hadoop framework 23 from the Apache Software Foundation allows the distributed processing of large amounts of data over a plurality of cluster nodes 11 using simple programming models and is thus particularly suitable in solving big data problems. The Hadoop framework 23 is itself implemented in Java and thus runs within the Java runtime environment 20. The Java application 22 and the Hadoop framework 23 load the Java classes necessary for the execution thereof via a class loading device 24 (or "Java class loader"), e.g., from a library 25. In the example, the library 25 includes inter alia executable bytecode, previously translated by a Java compiler, of different Java classes.

In FIG. 2, the R runtime environment 21 includes one or more documents with R source code 26. Individual functions or complete programs are implemented by the R source code 26. In this respect, the R source code 26 can be based inter alia on standard functions 27 of an R system library 28.

The R source code 26 is interpreted in a conventional manner. For this purpose, in conventional R runtime environments a separate interpreter having a parser for R source code is required. The parser analyzes the R source code step-by-step before it is executed by the interpreter. It is fundamentally also possible that parts of programs written in the R programming language are themselves written in other programming languages such as C or Fortran. Such program parts themselves then run partly at a higher speed.

It is known to call R source code 26 of a function from a Java application 22. For this purpose, an input/output loop is generally provided from the Java application 22 to the R runtime environment 21. Within the R runtime environment the R program code is then interpreted as described above. This approach is problematic in that the Java application 22 can be executed only at a comparatively low speed due to the interpretation of the called R source code 26.

To circumvent this and other problems, the class loading device 24 of the cluster node 11 of the described example was expanded to the effect that it was able to resolve function calls to the R source code 26. In particular, the class loading device 24 is suitable to load corresponding R source code 26 in accordance with a class call and generate Java bytecode of a corresponding Java class 29 in the background based on the read-in R source code 26, which Java class can subsequently be returned to the calling Java application 22. Methods corresponding to the function of the R source code 26 of the compiled Java class 29 can be executed as Java bytecode within the Java runtime environment 20. Program parts in other programming languages such as the C or Fortran languages incorporated in the R source code can be called within the Java application 22 via suitable interfaces without a loss of speed, in particular via the so-called Java Native Interface (JNI) Application Programming Interface (API). In this case, it is no longer necessary to provide an R interpreter for the R runtime environment 21.

Preferably, the thus generated executable Java class 29 is additionally stored in the library 25 so that in the event of a subsequent call of the corresponding R source code 26, no renewed dynamic generation of the Java class 29 is necessary. Instead, the class loading device 24 then loads the Java class 29 already stored in the library 25 and makes this class available for use in the Java runtime environment 20.

The buffering of previously compiled R source code 26 is particularly suitable for the standard functions 27 of the R system library 28. Accordingly, in one example, executable Java classes, which correspond to the standard functions 27 in terms of their functional scope, are stored in the library 25.

The modified class loading device 24 thus permits the direct calling of functions present as R source code 26 within the Java runtime environment 20. By using this approach, the execution of programs in part comprising Java code and in part comprising R source code can be accelerated. In the example, the class loading device 24 thus assumes the function of checking as to whether a corresponding Java class 29 is already contained in the library 25 and also, if such a corresponding class 29 is not contained in the library 25, the dynamic generation of a corresponding Java class 29. Alternatively, these two functions can also be assumed by separate software components.

In addition, the extensive integration of functions of the R programming language into the Java runtime environment 20 also permits an improved transfer of parameters between the Java application 22 and the function of the R source code 26. In particular, this no longer needs to be effected using a relatively slow and error-prone looping of inputs and outputs between the two runtime environments 20 and 21. Instead, parameters to be transferred to the R source code 26 can be transferred directly in the storage device in the form of Java objects. Conversely, results of the R source code 26 can be transferred back to the Java application 22 in the form of Java objects.

Figure 3:
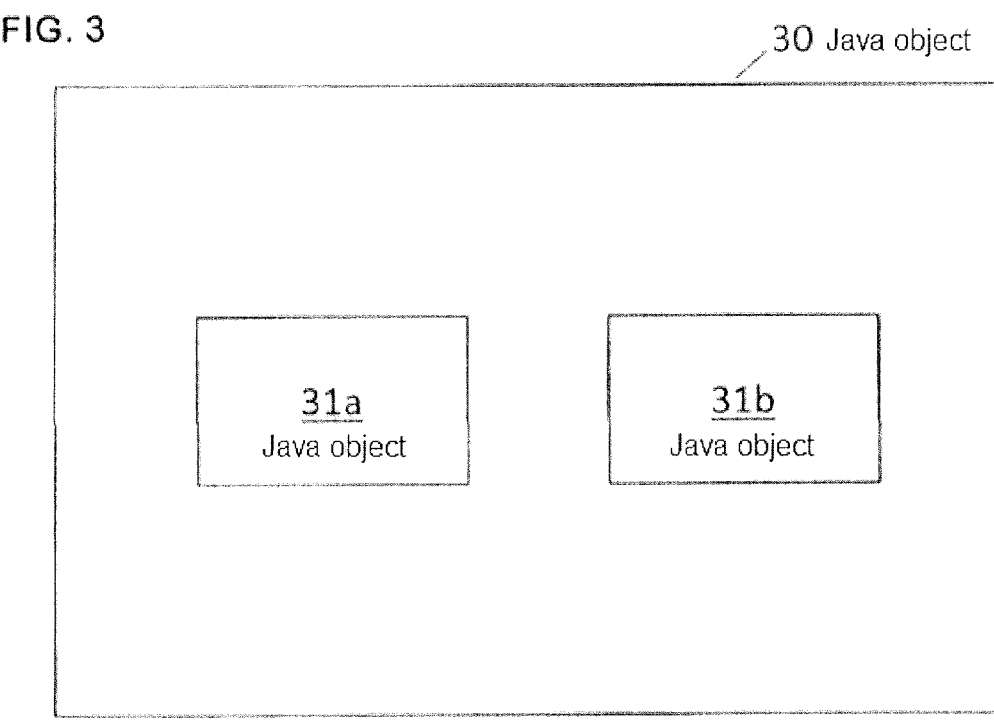
FIG. 3 shows Java classes for representing an R runtime environment.

FIG. 3 shows a possible representation of objects of an R runtime environment 21 as corresponding Java objects. In accordance with the representation in FIG. 3, the R runtime environment 21 is itself mapped onto a corresponding Java object 30. The Java object 30 is, for example, an instance of a Java container class which represents the R runtime environment 21. It includes a number of further Java objects 31a and 31b which each represent objects within the R runtime environment. For example, the Java object 31a represents a data structure having a multiplicity of data stored therein, the data intended for exchange between a Java application 22 and a function in the R source code 26. A specific feature of the R programming language resides in the fact that functions themselves can be transmitted as parameters to other functions. Accordingly, the second Java object 31b represents an access function that accesses the HDFS provided over the Hadoop framework 23.

In the example, the Java object 30 having the Java objects 31 contained therein as a parameter is transferred to the Java class 29 corresponding to the R source code 26 as a parameter. In this manner, the data of the first Java object 31a and the access function of the second Java object to access the HDFS file system of the corresponding Java class 29 are available. Therefore, the access function is effectively injected into the function of the R source code 26. By injecting the Java object 31b into the R source code 26, program parts contained therein can easily access data, stored in a distributed manner, of the cluster system 10 via Java methods provided by the Hadoop framework 23. It is not required to write the program code, which is required for access, itself in the R programming language. Instead, corresponding functions, encapsulated as methods of the Java object 31b, can be transferred as parameters to the corresponding R source code 26. Results generated by the function implemented by the R source code 26 can be returned as further Java objects 31 to the calling Java application 22.

Figure 4:
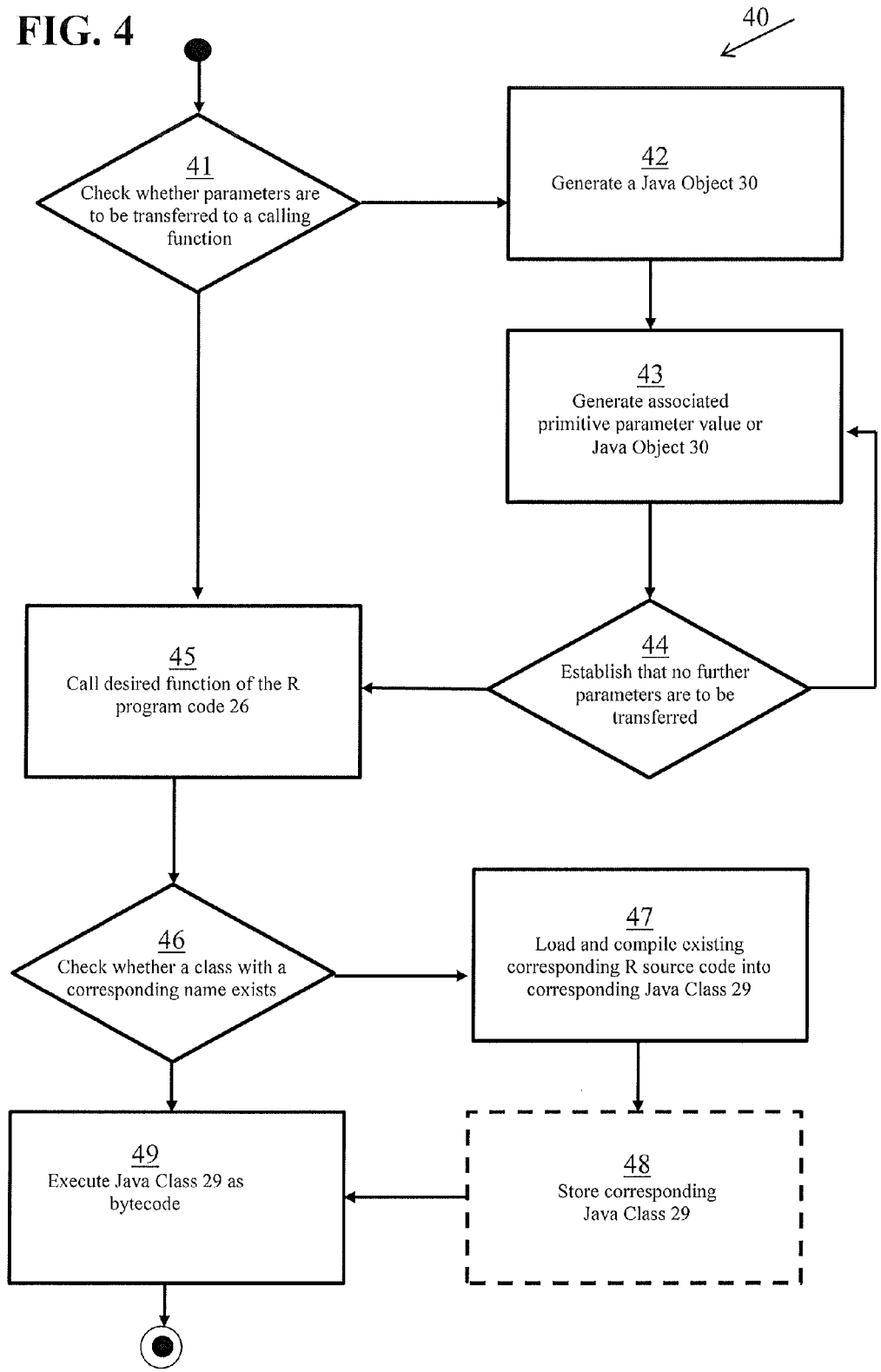
FIG. 4 shows a flow diagram of a method of executing a function written in the R programming language.

FIG. 4 shows a flow diagram of a method 40 of executing R source code 26 in a Java runtime environment 20.

Before the actual calling of a function of the R source code 26, a check is made in a first step 41 whether parameters are to be transferred to the calling function. If this is the case, a Java object 30, e.g., an instance of a container class, is initially generated in a step 42 and represents the R runtime environment 21. Subsequently, in one or a plurality of steps 43, associated primitive parameter values or Java objects 31 are generated and represent parameters to be transferred to the R runtime environment 21. For example, data to be transferred or access methods, also written in Java, for data access can be allocated to the Java object 30. Step 43 is repeated until it is established in step 44 that no further parameters are to be transferred.

Alternatively, a link to an R environment can be set as a parameter for an instance of the corresponding Java class 29. The R environment contains all the current state variables. Methods of the corresponding Java class 29 can access these variables. The R environment thus forms a part of the R runtime environment 21 and can be stored on a storage medium for subsequent use.

If the parameters to be transferred have been generated accordingly as Java objects 31 or have been made accessible via a link to an R environment or there is no intention to transfer parameters, then the desired function of the R program code 26 can be called in a step 45. For example, an instance of a Java class is generated and a method contained therein is called. In a Java runtime environment 20, this causes a class loading device 24 to check, in a step 46, whether a class with the corresponding name exists. If so, the corresponding Java class 29 is loaded as bytecode and the called method is executed in the Java runtime environment 20 in step 49.

Otherwise, that is to say if no corresponding Java class 29 can be found in the library 25 in step 46, the modified class loading device 24 checks, in a step 47, whether corresponding R source code 26 exists in the R runtime environment 21. For example, a search can be made for an R object or an R function having the name of the called class. In one example, a differentiation is made between "real" Java classes and Java classes 29 corresponding to R functions by suitable namespaces. If the desired R source code 26 exists, it is loaded in step 47 and compiled into a corresponding Java class 29. For this purpose, the R source code 26 is initially analyzed by a parser and subsequently converted into corresponding executable Java bytecode. Subsequently, an instance of the Java class 29 can be generated or static methods of the Java class 29 can be directly called.

In an optional step 48, the corresponding Java class is stored in a library 25 for subsequent use. Subsequently, the Java class 29 dynamically generated in this manner can be executed as bytecode within the Java runtime environment 20 in step 49.

The cluster system 10 and the method 40 are suitable to solve a wide variety of big data problems. The analysis of data from stock exchange trading will be used hereinafter as a specific example. Such data, for example, can be detected and stored in a decentralized manner for different trading centers. It is assumed hereinafter that one file generated in different cluster nodes 11 is stored per trading day/location in each case.

In the example, initially an evaluation function is developed to perform an analysis of an individual share value, e.g., based on a regression or other statistical analysis. The R programming language is particularly suitable for the development of this evaluation function, having the statistical functions available therein or therefor, e.g., the standard functions 27 of the R system library 28. The developed evaluation function is thus initially present as R source code 26.

To be able to effectively evaluate all the available data, the object is achieved using the MapReduce approach in accordance with the Java Hadoop framework 23. For this purpose, Java code is written which selects the share value to be analyzed. By the map( ) function of the Hadoop framework 23, all the data, relevant for this share value, from the different cluster nodes 11 are collected. The associated reduce( ) function uses the evaluation function written in R to perform the actual analysis. For this purpose, a class corresponding to the evaluation function is instantiated within the Hadoop framework 23.

The class loading device 24 recognizes that the evaluation function is to be called as per the R source code 26 and accordingly loads the R source code 26. The R source code 26 is parsed and is compiled in executable Java bytecode. The corresponding Java class 29 resulting therefrom is then instantiated within the Java runtime environment 20 and the generated instance is supplied back to the calling Java class of the Java application 22 or of the Hadoop framework 23.

Within the reduce( ) function, the actual evaluation function can then be called as a method of the instance of the Java class 29 generated by the class loading device 24. As described above, data can be transferred to the method as parameters. The data are transferred in the form of Java objects between parts of the Java application 22 or the Hadoop framework 23 and the evaluation function in the storage device. Any objects can be transferred, e.g., Java objects with methods for direct access to the HDFS. In this manner, the evaluation function written in R can also directly access data in the HDFS.

With the execution of the evaluation function as compiled Java bytecode, the execution speed is considerably greater than in the case of interpreting the R source code 26 within the R runtime environment 21.

The invention claimed is:

1. A Java class loading device stored on a non-transitory storage device, the Java class loading device comprising:
    a Java runtime environment,
    a loading component configured to load predetermined source code written in R programming language to parse the R source code;
    a compiler configured to compile the parsed R source code into bytecode for at least of a first Java class corresponding to the R source code;
    a transfer component configured to transfer the compiled bytecode to the Java runtime environment; and
    a processor configured to execute the compiled bytecode of methods contained in the first Java class by a calling Java application, wherein the compiled bytecode is executed on subsequent executions without a new interpretation of the R source code in the Java runtime environment.

2. The device according to claim 1, further configured to store the bytecode of the at least one first generated Java class in a library with bytecode of compiled Java classes and, upon a subsequent request for the predetermined R source code, transfer the compiled bytecode, stored in the library, of the first Java class to the Java runtime environment.

3. The device according to claim 1, further configured to compile at least some functions of an R system library of an R runtime environment in corresponding bytecode of Java classes or retrieve corresponding bytecode of already-compiled Java classes from a library.

4. The device according to claim 1, which provides at least a second and a third Java class, wherein instances of the second Java class represent a current state of an R runtime environment, instances of the third Java class represent objects of the R runtime environment and a plurality of instances of the third Java class can be allocated to one instance of the second Java class.

5. The device according to claim 4, wherein the at least one first Java class comprises at least a method with a transfer parameter with a type in accordance with the second Java class and/or a method with a result type in accordance with the second Java class so that information of an R runtime environment can be transferred as instances of the third Java class to/from the at least one method.

6. A cluster system having a plurality of mutually coupled cluster nodes that process extensive data, wherein each of the cluster nodes includes at least one mass storage device and a data processing device, wherein each of the cluster nodes has a Java runtime environment, at least one Java runtime environment has a Java class loading device according to claim 1 and is configured to compile R source code of at least one function using the class loading device in corresponding bytecode of a first Java class.

7. The cluster system according to claim 6, wherein each cluster node further comprises a Java framework to implement a MapReduce algorithm and access a distributed file system to store data on the plurality of cluster nodes.

8. The cluster system according to claim 7, wherein the Java runtime environment is configured to inject a Java method of accessing the distributed file system into the corresponding executable first Java class during execution of the at least one function of the R runtime environment.

9. A method of executing a function written in R programming language in a Java runtime environment, the method comprising:
   loading predetermined R source code written in the R programming language by at least one Java class loading device;
   compiling the function of the R source code into bytecode for at least of a first Java class with a method corresponding to the function of the R source code;
   transferring the compiled bytecode to the Java runtime environment; and
   executing the function within the Java runtime environment by calling the compiled bytecode of the corresponding method of the first Java class by a calling Java application, wherein on subsequent executions of the compiled bytecode of the corresponding method contained in the first Java class, the compiled bytecode is executed without a new interpretation of the R source code.

10. The method according to claim 9, wherein the corresponding method of the first Java class expects at least one Java object in accordance with a second Java class as a parameter, the at least one Java object represents a current state of an R runtime environment, and the corresponding method of the first Java class is executed using an instance of the second Java class as a parameter.

11. The cluster system according to claim 7, wherein the Java framework is a Hadoop framework.

12. The cluster system according to claim 7, wherein the cluster nodes are a Hadoop Distributed File System (HDFS).

* * * * *